United States Patent
Gill et al.

(10) Patent No.: US 8,129,974 B1
(45) Date of Patent: Mar. 6, 2012

(54) SYSTEMS AND METHODS FOR SELF-RECYCLING POWER

(75) Inventors: Jaspal Gill, Danville, CA (US); David Owen, Livermore, CA (US); Thuan Che, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 754 days.

(21) Appl. No.: 11/847,659

(22) Filed: Aug. 30, 2007

(51) Int. Cl.
*G05F 1/40* (2006.01)

(52) U.S. Cl. .................. 323/288; 307/139; 379/412

(58) Field of Classification Search .............. 323/266, 323/271, 282, 284, 288; 307/125, 126, 130, 307/139, 140; 379/412, 413
See application file for complete search history.

(56) References Cited

U.S. PATENT DOCUMENTS

| | | | | |
|---|---|---|---|---|
| 4,061,949 A * | 12/1977 | Griffis | ............................ | 318/154 |
| 6,055,068 A * | 4/2000 | Abe et al. | ....................... | 358/468 |
| 6,420,860 B1 * | 7/2002 | Yamaguchi | .................... | 323/288 |
| 6,509,724 B1 * | 1/2003 | Ilic et al. | ........................ | 323/284 |
| 6,943,533 B2 * | 9/2005 | Okuno | ........................... | 323/222 |
| 2008/0054728 A1 * | 3/2008 | Watson | ........................... | 307/130 |

* cited by examiner

*Primary Examiner* — Jessica Han
(74) *Attorney, Agent, or Firm* — Harrity & Harrity, LLP

(57) ABSTRACT

A power system includes a switch, a capacitor and a comparator circuit. The power system receives a signal to turn off power supplied to the power system, turns off the switch that is used to supply power to the system and discharges the capacitor. The power system also compares a voltage across the discharging capacitor to a threshold voltage value, and turns on the switch to allow power to be supplied to the power system when the compared voltage across the discharging capacitor equals the threshold voltage value.

20 Claims, 5 Drawing Sheets

SYSTEMS AND METHODS FOR SELF-RECYCLING POWER

BACKGROUND OF THE INVENTION

The present invention relates generally to power systems and, more particularly, to power systems that reset or recycle power within the power system.

Conventional power systems generally include a main switch that enables an available voltage to be applied to a power system and controlling circuitry that receives commands from an external source to shut off or reset power to the system. In response to a received reset or recycle command, the controlling circuitry may turn the main switch to an off state. While the main switch is turned off, the controlling circuitry must rely on power from another source in order to switch the main switch back on. Providing additional power sources for controlling circuitry during reset periods adds to the cost and complexity of power systems.

SUMMARY OF THE INVENTION

According to one aspect, a method is provided. The method may comprise receiving a signal to turn off power supplied to a power system, where the power system includes a switch, and a capacitor; turning off the switch that is used to supply power to the power system and discharging the capacitor; comparing a voltage across the capacitor to a threshold voltage value; and turning on the switch to allow power to be supplied to the power system when the compared voltage across the capacitor equals the threshold voltage value.

According to another aspect, a device is provided. The device may comprise controlling power logic (CPL) configured to receive a signal to turn off power supplied to a power system; a first switch that receives a signal from the CPL to turn off power; a capacitor, where the capacitor begins to discharge when the first switch is turned off; and a voltage comparator circuit that compares a voltage of the discharging capacitor to a threshold voltage value and turns the first switch on when the voltage of the discharging capacitor equals the threshold voltage value.

According to another aspect, a method is provided. The method may comprise discharging a capacitor when a switch that supplies power to a power system is turned to an off state; and turning the switch to an on state when the capacitor has discharged to a threshold voltage level.

According to another aspect, a device is provided. The device may comprise means for controlling a switch to supply power to a power system; means for storing and discharging energy in the power system; and means for comparing a voltage produced by the means for storing and discharging energy in the power system to a threshold voltage when the means for controlling a switch has set the switch to an off state, where the means for comparing a voltage produced by the means for storing and discharging energy sets the switch to an on state when the compared voltage equals the threshold voltage.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the embodiments. Instead, the scope of the embodiments is defined by the appended claims and their equivalents.

Figure 1:
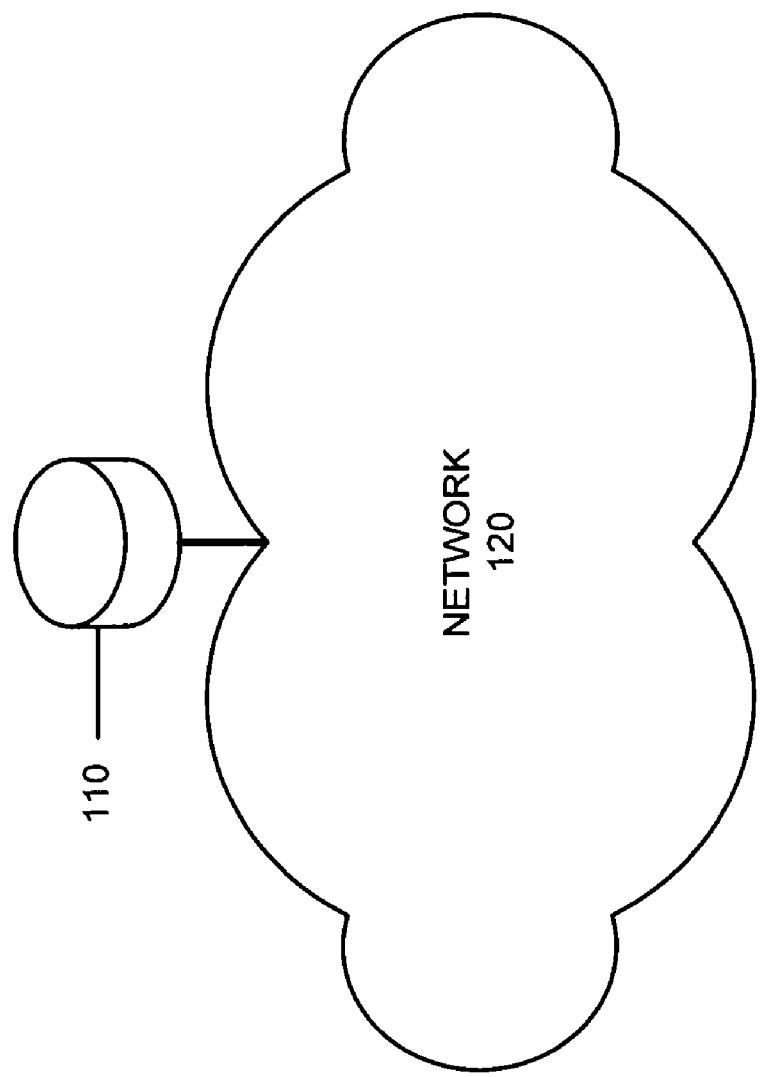
FIG. 1 is a diagram of an exemplary device.

FIG. 1 shows an exemplary device 110 in which concepts described herein may be implemented. As shown, device 110 may connect to network 120. Device 110 may include a device for performing network-related functions, such as a router, a server or a switch. Alternatively, device 110 may include a computer, communication device, etc., that communicates via network 120. Network 120 may include the Internet, an ad hoc network, a local area network (LAN), a wide area network (WAN), a metropolitan area network (MAN), a cellular network, a public switched telephone network (PSTN), any other network, or a combination of networks. Device 110 may communicate with other devices (not shown) and may communicate through a wired, wireless, or optical communication links via network 120.

Figure 2:
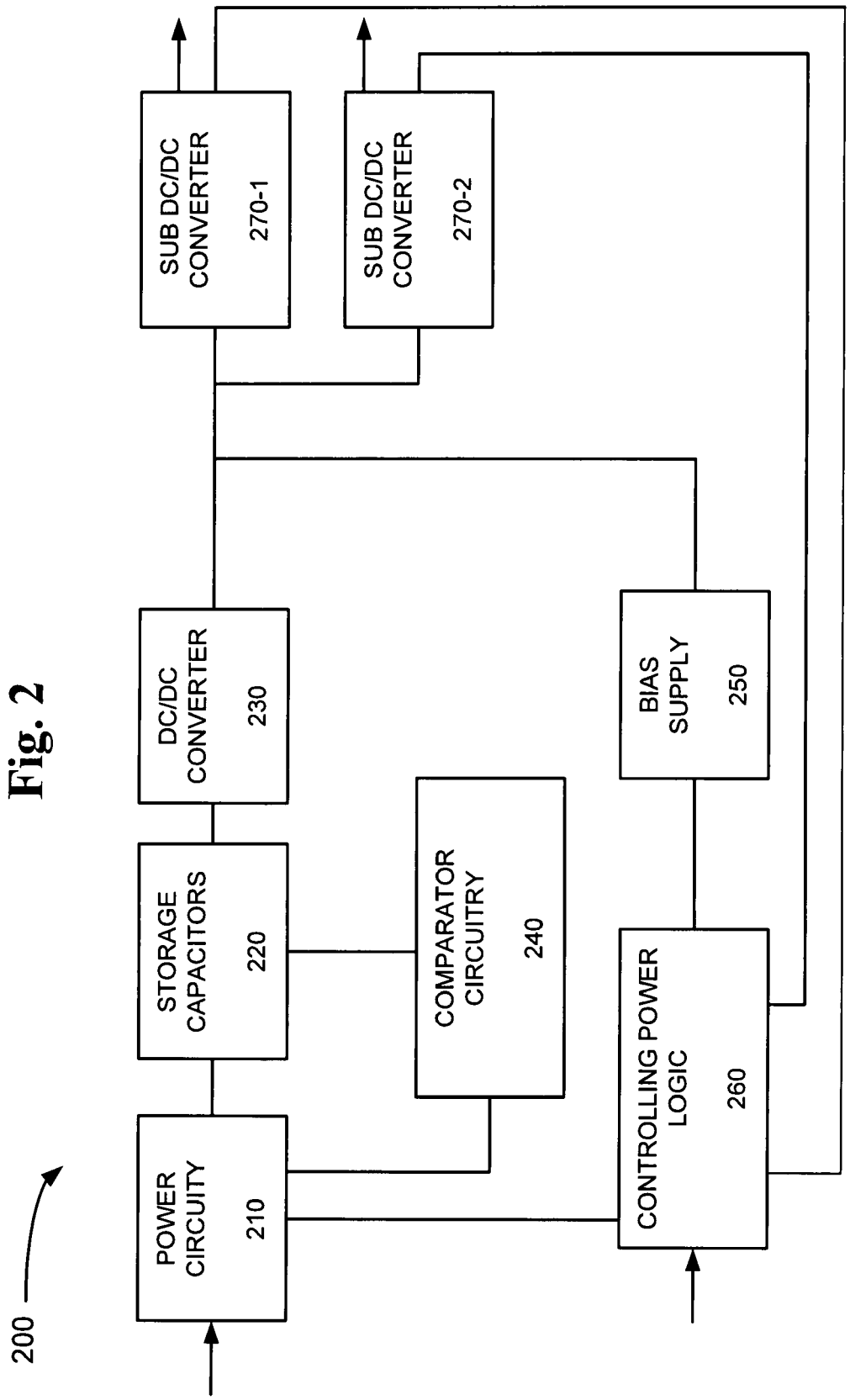
FIG. 2 is a block diagram of exemplary components of a power system included in the device as shown in FIG. 1.

FIG. 2 shows a block diagram of components within an exemplary power system 200 included in device 110. If device 110 is configured as a network device that controls forwarding of data, for example, there may be any number of exemplary power systems 200 included in device 110. For example, if device 110 is configured as a router, device 110 may include a number of line cards (e.g., 14 line cards), where each line card contains an exemplary power system 200. Power system 200 may include power circuitry 210, storage capacitors 220, DC/DC converter 230, comparator circuitry 240, bias supply 250, controlling power logic 260 and a number of sub assembly DC/DC converters 270-1 and 270-2 (referred to collectively as sub assembly DC/DC converters 270).

Power circuitry 210 may include switches and other circuitry used to receive direct current (DC) power from a source within device 110 and deliver power to storage capacitors 220. Input voltage into power circuitry 210 may be 48 volts DC, for example. When a main switch included within power circuitry 210 is in an off state, no component within power system 200 receives or consumes power.

Storage capacitors 220 may include capacitors used to store energy received from power circuitry 210. In an exemplary implementation, storage capacitors 220 may be large electrolytic capacitors. Storage capacitors 220 may also be connected to DC/DC converter 230 in order to stabilize the input voltage to DC/DC converter 230.

DC/DC converter 230 may include circuitry to convert a received DC voltage into another DC voltage. For example, the input voltage to DC/DC converter 230 may be 48 volts and the output voltage may be 12 volts. The output voltage of 12 volts may be applied to other DC/DC converters used in sub assemblies within power system 200 of device 110.

Comparator circuitry 240 may include circuitry that compares voltages and may activate a switch or send a switching signal in response to the comparison. For example, comparator circuitry 240 may receive or sense a voltage across storage capacitors 220 and may activate a switch and/or send a switching signal to power circuitry 210 in response to the sensed voltage.

Bias supply 250 may include circuitry to convert a received DC voltage and output a lower DC voltage. For example, bias supply 250 may receive 12 volts from DC/DC converter 230 and may output 5 volts to provide power to controlling power logic 260.

Controlling power logic (CPL) 260 may include circuitry that may receive signals from other components within device 110 and may send a signal to power circuitry 210 in response to the received signals. For example, CPL 260 may receive a power cycle signal and in response to this received signal, send a signal to set a switch in power circuitry 210 to an off state. CPL 260 may also send control signals to enable or disable individual sub assembly DC/DC converters 270 when power is turned on to device 110.

Sub assembly DC/DC converters 270 may include circuitry that receives an input voltage and outputs a lower voltage. For example, sub assembly DC/DC converter 270-1 may receive 12 volts from DC/DC converter 230 and output 3.3 volts to an Application Specific Integrated Circuit (ASIC) sub assembly within device 110. Sub assembly DC/DC converter 270-2 may receive 12 volts from DC/DC converter 230 and output 2.5 volts to a memory chip sub assembly within device 110. Sub assembly DC/DC converters 270 may also receive control signals from CPL 260. Although only two sub assembly DC/DC converters 270 are shown, it should be understood that any number of sub assembly DC/DC converters may be included within power system 200 depending on the voltage needs of various sub assemblies within device 110.

Figure 3:
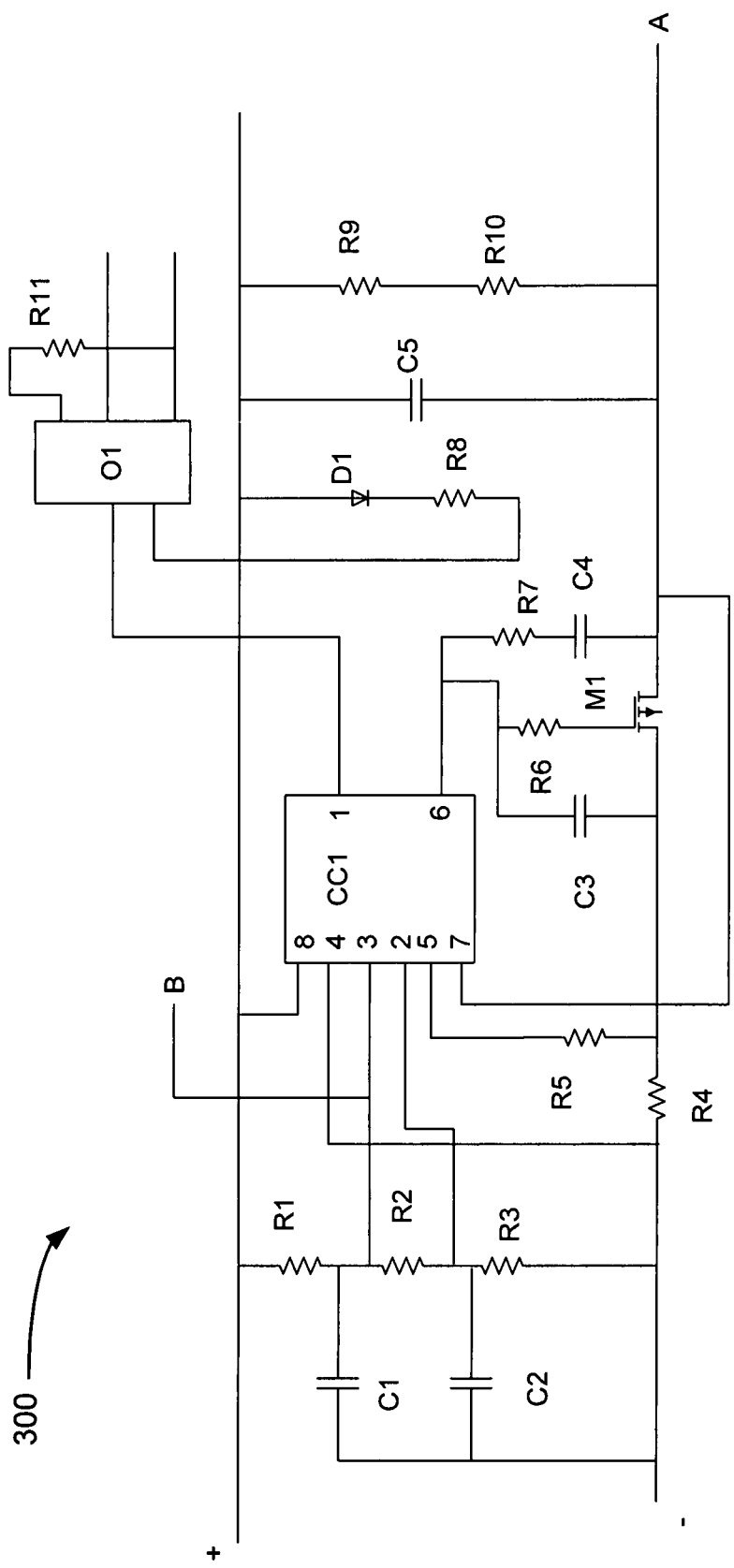
FIG. 3 is a schematic diagram of circuitry included in an exemplary power system.

FIG. 3 is a schematic diagram of circuit 300 that includes components included in the block diagram as shown in FIG. 2. Circuit 300 includes resistors R1-R11, capacitors C1-C5, diode D1, metal oxide semiconductor field effect transistor (MOSFET) M1, optical coupling device O1 and control chip CC1. In an exemplary implementation, circuit 300 includes circuitry included in power circuitry 210 and storage capacitors 220.

As shown, circuit 300 may be used as a "hot swap" circuit that may be used to turn power on and off when an electronic assembly such as a line card is replaced in device 110. In this exemplary circuit, control chip CC1 may be used to control power applied to power system 200 by controlling an on/off state of MOSFET M1. In this example, control chip CC1 may include eight ports, labeled as 1-8. In this example, port 1 provides a power operational signal to optical coupling device O1, port 2 senses/receives an over-voltage protection signal, port 3 senses/receives an under-voltage protection signal, ports 4 and 8 receive power (to power control chip CC1), port 5 receives a signal via resistor R5 indicating voltage at the source of MOSFET M1, port 6 provides a voltage signal to control the gate of MOSFET M1 and port 7 receives a signal indicating voltage at the drain of MOSFET M1. Resistors R6 and R7 and capacitor C3 and C4 may be used to establish bias voltages required for MOSFET M1. In response to monitoring and/or detecting an over voltage or under voltage condition, control chip CC1 may turn off/on MOSFET M1 based on the detected voltage conditions within circuit 300. When voltages in circuit 300 are within appropriate ranges, control chip CC1 may leave MOSFET M1 in an "on" state, for example.

When power is applied to circuit 300 and voltages are within appropriate ranges (as determined by CC1), current through diode D1 and resistor R8 is received at optical coupling device O1. Additionally, port 1 of CC1 is connected to optical coupling device O1 and a signal indicating the circuit 300 is operational may be transmitted (through resistor R11) from the output terminals of optical coupling device O1 to a system controller (not shown) within device 110.

Resistors R1-R3 and capacitors C1-C2 form a buffer circuit that ensures when voltage is applied (to the positive terminal) or connected to circuit 300, the applied voltage may gradually rise to the applied value. As described above for example, a voltage of 48 DC volts may be input to the positive terminal of circuit 300. Resistors R1-R3 and capacitors C1-C2 allow applied voltage and current to slowly rise and to begin charging capacitor C5 through resistor R4 and MOSFET M1. Capacitor C5 may store energy received from the positive terminal of circuit 300, and may be included in storage capacitors 220 as described above in FIG. 2. Resistors R9 and R10 allow for capacitor C5 to discharge energy.

As shown, both FIG. 3 and FIG. 4 (described in detail below) include a positive (+) and negative (−) terminals. It should be understood that these similarly labeled terminals are electrically connected together, for example, the positive (+) terminal in FIG. 3 is connected to the positive (+) terminal in FIG. 4, and the negative (−) terminal in FIG. 3 is connected to the negative (−) terminal in FIG. 4. Further, terminal A in circuit 300 may be connected to terminal A in circuit 400, and similarly, terminal B in circuit 300 may be connected to terminal B in circuit 400. In this manner, components and signals included in circuits 300 and 400 may interact with one another to perform the desired functions. As described below for example, components and signals within circuit 400 may be used compare a voltage across capacitor C5 as shown in FIG. 3.

Figure 4:
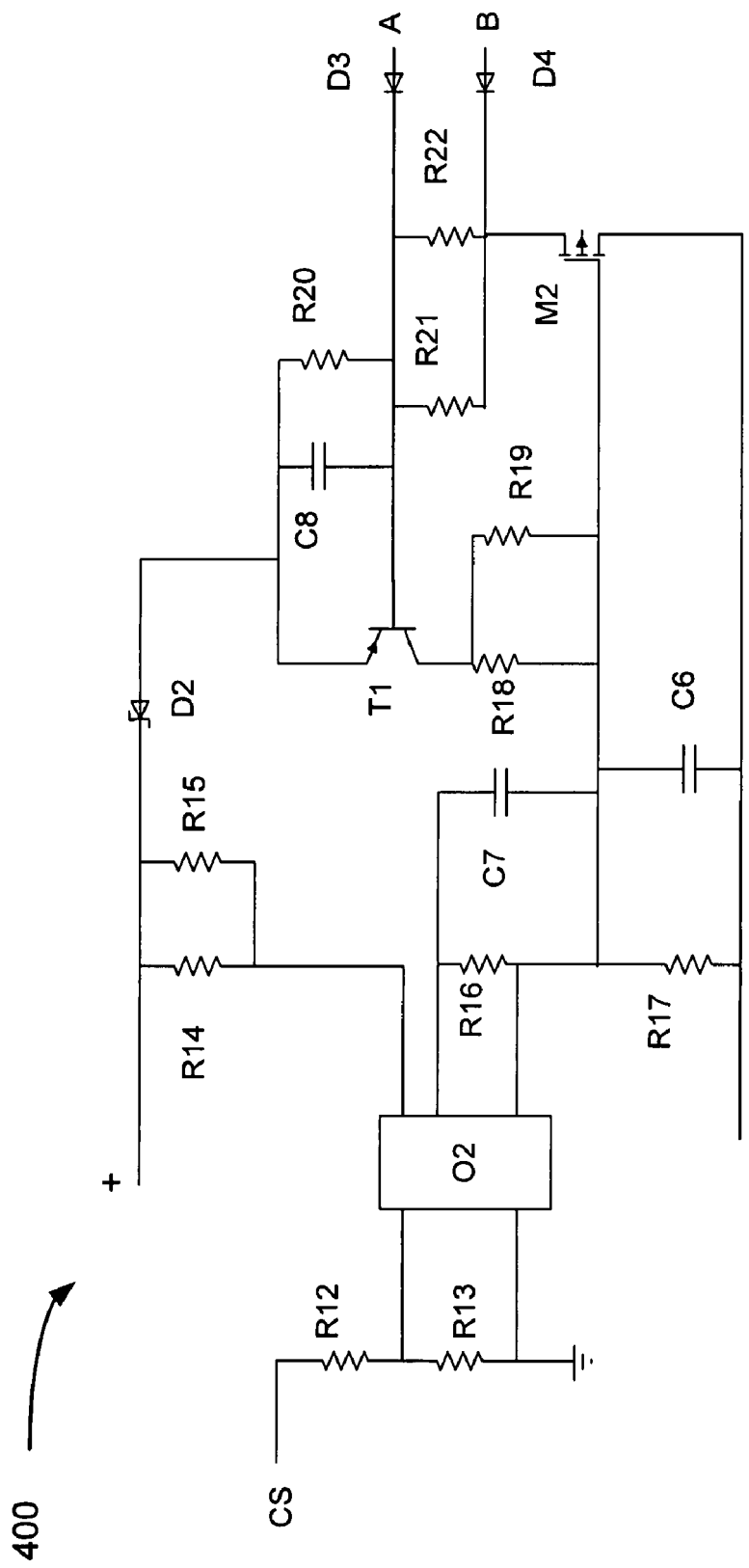
FIG. 4 is a schematic diagram of circuitry included in an exemplary power system.

FIG. 4 is a schematic diagram of circuit 400 that includes components shown in FIG. 2. Circuit 400 includes resistors R12-R22, capacitors C6-C8, diodes D2-D4, MOSFET M2, transistor T1 and optical coupling device O2. In an exemplary implementation, circuit 400 includes circuitry included in power circuitry 210 and comparator circuitry 240, as described above in FIG. 2.

As shown, circuit 400 may receive a control signal at terminal CS. For example, CPL 260 may send a power recycle signal that turns off the power (48 volts DC applied to the positive terminals in circuits 300 and 400), which may be received at the CS terminal. This received signal may be routed through resistors R12 and R13 to optical coupling device O2. Optical coupling device O2 receives power from the positive terminal of circuit 400 through resistors R14 and R15. Optical coupling device O2 couples the received power recycle signal command to the gate of MOSFET M2 through resistor R16. In other embodiments, optical coupling device O2, capacitor C7 and resistors R12-R16 may not be included in circuit 400. In this case, a received power recycle command signal may be connected directly to the gate of MOSFET M2.

A received power recycle signal drives the gate of MOSFET M2 to a high voltage and turns MOSFET M2 to a conducting or "on" state. Once MOSFET M2 is turned on, the drain of MOSFET M2 may be connected to port 3 of CC1 (via terminal B as shown in FIGS. 3 and 4) via diode D4. As described above, the signal on port 3 of CC1 is an under-voltage protection signal, where CC1 may shut down power to circuits 300 and 400 by turning off MOSFET M1 (via port 6 as shown in FIG. 3) when MOSFET M2 turns on. It should be understood that circuit 400 may be in an off state until a power recycle command is received. In addition, the received power recycle signal may be a temporary signal that does not remain in an "on" or high state, for example.

When MOSFET M2 turns on, the drain is connected to the base of transistor T1 through resistors R21 and R22. MOS- FET M2 may then draw current from the base of transistor T1 and cause transistor T1 to turn on. Once transistor T1 turns on, it begins to supply power to the gate of MOSFET M2 through resistors R18 and R19. In this example, MOSFET M2 and transistor T1 form a latched circuit.

With the power to circuits 300 and 400 turned off, capacitor C5 may begin to discharge its stored energy through resistors R9 and R10. The positive terminal of C5 is also connected through diode D2 to the emitter of transistor T1. Diode D2 may be a Zener type of diode and may have a voltage drop of 11 volts, for example. The voltage drop across the emitter to the base of transistor T1 may be an additional 0.7 volts. In this example, the voltage difference between the positive terminal of capacitor C5 and the base of transistor T1 is approximately 12 volts. The base of transistor T1 connects to the negative terminal of capacitor C5 through diode D3 via terminal A. In this manner, diode D2, transistor T1 and diode D3 form a voltage comparator type of circuit where a voltage threshold may be approximately 12 volts. For example, if capacitor C5 is charged up to 48 volts, it may begin to discharge until it reaches 12 volts. When the voltage across capacitor C5 decreases to a value of 12 volts, diode D3 gets forward biased and starts conducting and the voltage at the base of transistor T1 increases until it is equal to the voltage at the emitter of transistor T1. This results in an inadequate biasing voltage, that produces a non-conducting off state for transistor T1. Once transistor T1 is turned off, it can not provide power to the gate of MOSFET M2, which results in MOSFET M2 being turned off. With the latched transistor T1 and MOSFET M2 being in an off state, the under voltage shutdown port (3) of CC1 is no longer pulled to a low voltage by MOSFET M2 via diode D4. Therefore, as CC1 no longer detects an under voltage condition, CC1 turns MOSFET M1 back on, which turns power back on to converter 230.

In this example, as capacitor C5 discharges its stored energy through resistors R9 and R10, the voltage across capacitor C5 may begin to decrease while the voltage across the source to the drain of MOSFET M1 may begin to increase. Assume the voltage at the positive terminal is 48 volts. When the voltage across capacitor C5 reaches 12 volts, the voltage across M1 may equal 36 volts. A signal applied at the gate of MOSFET M1 may then turn MOSFET M1 on, which turns power back on to circuits 300 and 400. In this manner, a received power recycle command turns on circuit 400 until capacitor C5 has discharged to the threshold voltage value. Then circuit 400 turns back off and turns MOSFET M1 (in circuit 300) back on.

Figure 5:
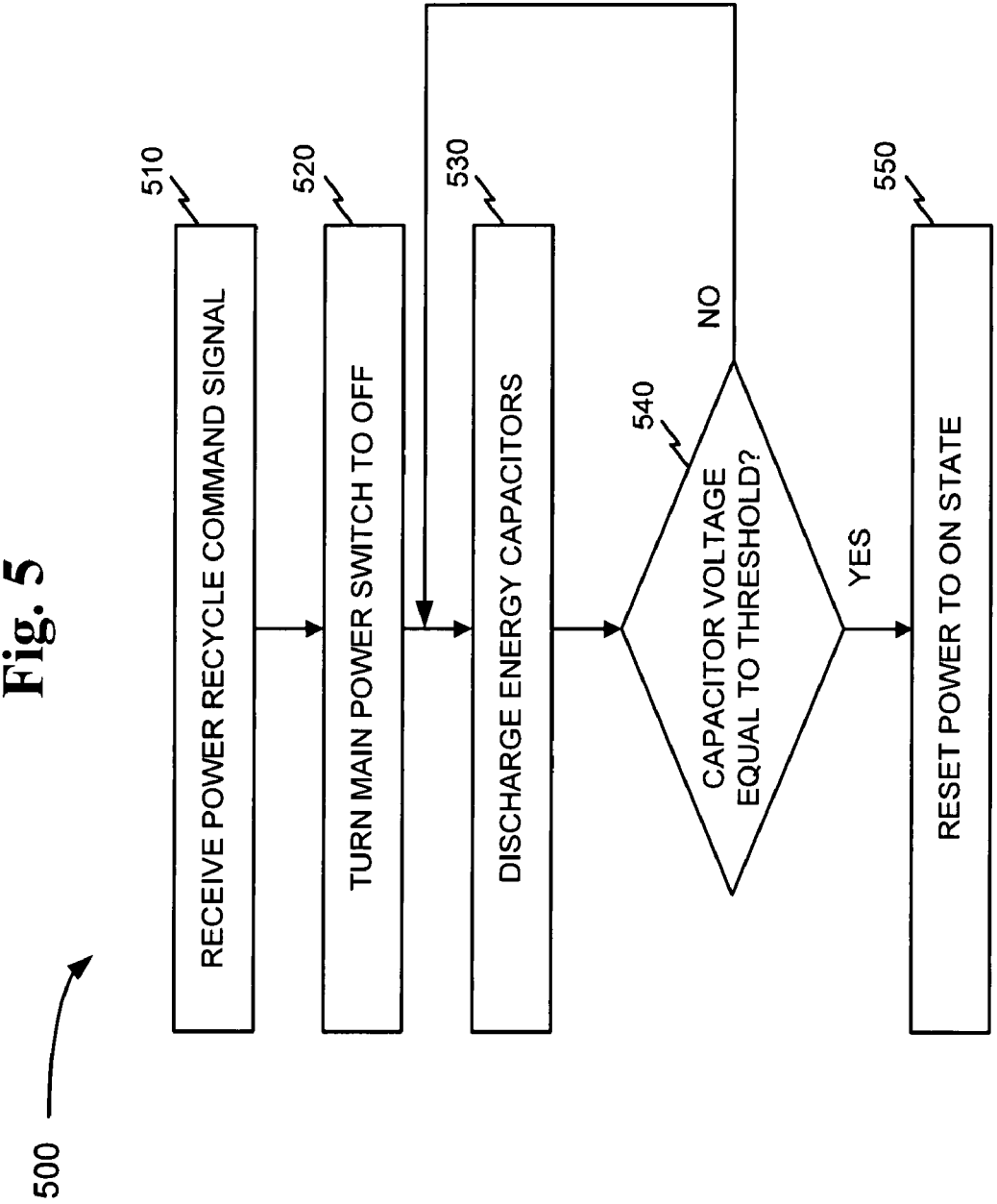
FIG. 5 is an exemplary flow diagram of a process that recycles power in the exemplary power system as shown in FIGS. 3-4.

FIG. 5 illustrates an exemplary process 500 of recycling power within a power system. Process 500 may be enacted for example, when a control assembly within device 110 instigates a power recycle command for any number of reasons. Process 500 may begin when a power recycle command signal is received (block 510). As described above for example, CPL 260 may receive a command from a control system within device 110 to recycle or reset the power applied to power system 200. In response to this received signal, CPL 260 may send a signal to power circuitry 210 to turn off a main power switch (block 520). As described above with reference to FIGS. 3-4 for example, the signal transmitted from CPL 260 may be received at terminal CS that results in turning off MOSFET M1. Once MOSFET M1 is turned off, there is no power applied to any component included in power system 200.

After MOSFET M1 is turned off, energy storage capacitors may begin to discharge (block 530). For example, capacitor C5 may discharge energy through resistors R9 and R10. As C5 discharges, its voltage is compared to a threshold value (block 540). As described above, diode D2, transistor T1 and diode D3 form a voltage comparator type of circuit where a voltage threshold may be approximately 12 volts. As capacitor C5 discharges, it's voltage is (compared) applied across diode D2 to the base of transistor T1, which forms a comparator circuit with a threshold of 12 volts, for example. If the voltage of capacitor C5 is greater than the threshold (No in block 540) process 500 may return to block 530 as the capacitor C5 may continue to discharge.

When the voltage of capacitor C5 has decreased to be equal to the threshold value (Yes in block 540), the power may be turned back to an on state (block 550). For example, if the voltage across capacitor C5 is 12 volts, there is not enough voltage to turn transistor T1 on, so the latch circuit formed by T1 and MOSFET M2 is turned off and MOSFET M1 may be turned back on via diode D4 and CC1. In this manner, the main power switch (MOSFET M1) may be controlled without power being applied to power system 200. Additionally, the rate at which capacitor C5 discharges may be changed by changing the values of resistors R9 and R10. For example, a time constant of discharging capacitor C5 is determined by the values of resistors R9 and R10. The values of resistors R9 and R10 may be set to form a time constant on the order of fractions of a second, a number of seconds, or minutes, for example. In this manner, the time it takes capacitor C5 to discharge to the threshold voltage (time period in which power system 200 resets) may be adjusted for any reason related to power system requirements. Further, the threshold voltage value (determined by the voltage drop from diode D2 to the base of transistor T1) may also be changed by changing the components and/or voltage requirements of these components.

CONCLUSION

Consistent with the principles described herein, the exemplary power system may use stored energy to control a main power switch during periods when the main power switch is turned off and no power is applied to the system.

The foregoing description of preferred embodiments provides illustration and description, but is not intended to be exhaustive or to limit the embodiments to the precise form disclosed. Modifications and variations are possible in light of the above teachings or may be acquired from practice of the embodiments. For example, while series of acts have been described with regard to FIG. 5, the order of the acts may differ or be performed in parallel in other implementations consistent with the present embodiments. No element, act, or instruction used in the description of the principles of the embodiments should be construed as critical unless explicitly described as such. Also as used herein, the article "a" is intended to include one or more items. Where only one item is intended, the term "one" or similar language is used.

The scope of the embodiments is defined by the claims and their equivalents.

Even though particular combinations of features are recited in the claims and/or disclosed in the specification, these combinations are not intended to limit the invention. In fact, many of these features may be combined in ways not specifically recited in the claims and/or disclosed in the specification.

What is claimed is:

1. A method comprising:
   receiving, by a controller of a line card connected to a network device, a signal to completely turn off power supplied to a power system of the line card, where the power system includes the controller, a first switch that is used to supply power to the power system, a second switch that is used to control the first switch, and a capacitor;
detecting, based on receiving the signal, a voltage condition associated with the power system;
opening, in response to detecting the voltage condition, the first switch to completely turn off the power supplied to the power system, where when the first switch is opened a voltage across the capacitor comprises an initial voltage;
discharging the capacitor, where the capacitor discharges in response to opening the switch;
closing, in response to discharging the capacitor, the second switch of the power system, where the closing of the second switch prevents the first switch from closing;
detecting, during the discharging of the capacitor, that the voltage across the capacitor comprises a threshold voltage, where the threshold voltage is less than the initial voltage; and
opening, in response to detecting that the voltage across the capacitor comprises the threshold voltage, the second switch to close the first switch, where closing the first switch causes power to be supplied to the power system.

2. The method of claim 1, where the received signal to completely turn off power supplied to the power system is a temporary signal that is terminated prior to detecting that the voltage across the capacitor comprises the threshold voltage.

3. The method of claim 1, where the first switch comprises a metal oxide semiconductor field effect transistor MOSFET transistor.

4. The method of claim 3, where the second switch comprises a latched circuit that includes a diode and a transistor.

5. The method of claim 4, where the voltage across the capacitor comprising the threshold voltage is detected by the latched circuit.

6. A network device, comprising:
controlling power logic (CPL) to receive a first signal to recycle power supplied to a power system of a line card that is removably connected to the network device;
a first switch to:
 receive, in response to the CPL receiving the first signal, a second signal from the CPL, where receiving the second signal causes the first switch to transition from a non-conducting state to a conducting state, and
 transmit, in response to transitioning to the conducting state, a third signal to a controller of the power system;
the controller to detect, in response to receiving the third signal, a voltage condition within the power system, where the controller completely turns off the power supplied to the power system in response to receiving the third signal and the first switch continues to transmit the third signal to the controller while the power supplied to the power system is turned off; and
a capacitor, where the capacitor begins to discharge when the power supplied to the power system is turned off,
where the first switch is further to:
 prevent a second switch, for supplying power to the power system, from being turned on when a voltage across the capacitor is greater than a threshold voltage, and
 stop transmitting, in response to the voltage across the capacitor being equal to or less than the threshold voltage, the third signal to the controller, and
where the controller is further to:
 determine, in response to the first switch stopping the transmitting of the third signal, that the voltage condition is no longer present, and
 cause, in response to determining that the voltage condition no longer is present, the second switch to be turned on and to supply power to the power system.

7. The device of claim 6, where the second switch comprises a metal oxide semiconductor field effect transistor (MOSFET) transistor.

8. The device of claim 6, where the first switch comprises a latched circuit that includes a diode and a transistor.

9. The device of claim 8, where the voltage across the capacitor comprising the threshold voltage is detected by the latched circuit.

10. The device of claim 6, where no power is supplied to the CPL when the second switch is caused to completely turn off the power supplied to the power system.

11. A method comprising:
detecting, by a controller of a network device, a voltage condition within a power system of the network device;
setting, in response to detecting the voltage condition, a switch to an off state, where the switch supplies direct current (DC) power to the power system and no DC power is supplied to the power system when the switch is set to the off state;
discharging a capacitor when the switch is set to the off state, where a voltage across the capacitor comprises an initial voltage when the switch is set to the off state;
detecting, by the controller, that the voltage condition is no longer present within the power system, where the controller detects that the voltage condition is no longer present based on the discharging of the capacitor causing the voltage across the capacitor to be reduced from the initial voltage to a threshold voltage; and
turning the switch to an on state in response to detecting that the voltage condition is no longer present.

12. The method of claim 11, further comprising:
receiving, by the power system, a signal to turn off power supplied to the power system, where voltage condition results from receiving the signal to turn off the power supplied to the power system.

13. The method of claim 11, where setting the switch to the on state further comprises:
opening, in response to the detecting that the voltage across the capacitor comprises the threshold voltage, another switch, where opening the other switch causes the switch to be set to the on state; and
charging the capacitor when the switch is set to the on state.

14. The method of claim 13, where the voltage across the capacitor comprising the threshold voltage is detected by a transistor and a diode of the other switch.

15. A network device, comprising:
a line card comprising:
 a first component to:
  detect an under voltage condition within the line card, and
  control, in response to detecting the voltage condition, a switch to supply power to a power system, of the line card, where no power is supplied to the line card by the power system when the switch is set to an off state;
 a second component to store and discharge energy in the power system, where the discharge of energy by the second component produces a voltage; and
 a third component to:
  compare the voltage produced by the second component to a threshold voltage when the first component has set the switch to an off state, and set another switch to an off state when the voltage produced by the second component equals a threshold voltage, and where the first component is further to:

determine, based on the third component setting the other switch to the off state, an absence of the under voltage condition, and set, based on determining the absence of the voltage condition, the switch to an on state to allow power to be supplied to the line card.

16. The network device of claim 15, where the switch comprises a MOSFET transistor.

17. The network device of claim 15, where the second component comprises a capacitor.

18. The network device of claim 17, where the third component comprises a diode and a transistor.

19. The network device of claim 18, where no power is supplied to the first component when the switch is set to an off state.

20. The network device of claim 18, where the diode and the transistor form a latched circuit.

* * * * *